F. L. SESSIONS.
METHOD OF AND APPARATUS FOR ELECTRICALLY WELDING TUBING.
APPLICATION FILED MAR. 24, 1919.
1,365,198.
Patented Jan. 11, 1921.
3 SHEETS—SHEET 1.
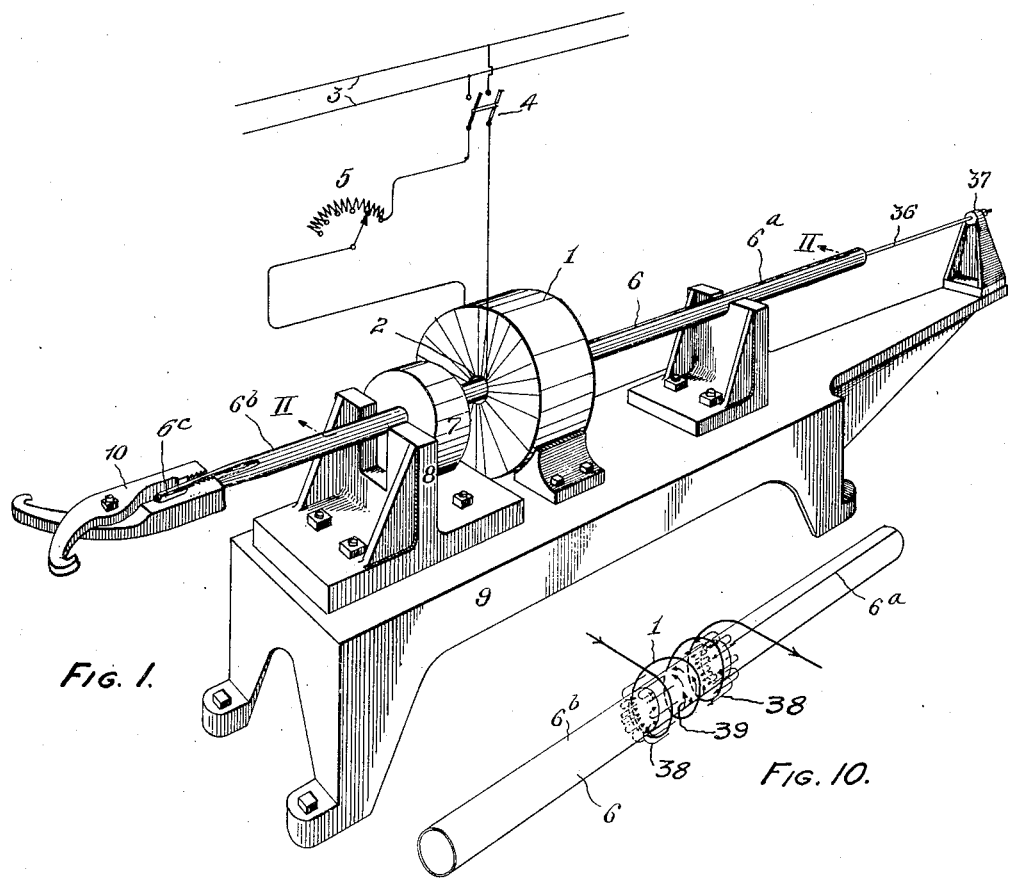
Fig. 1.
Fig. 10.
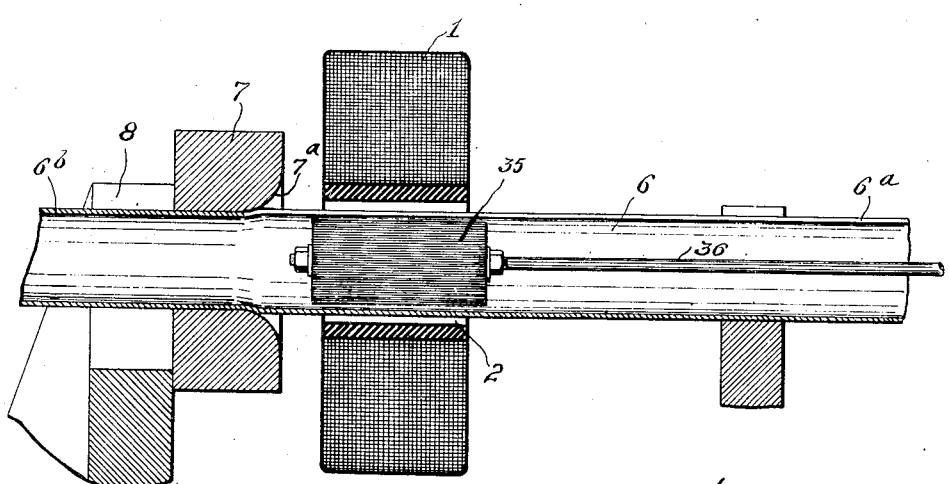
Fig. 2.
INVENTOR:
Frank L. Sessions F. L. SESSIONS.
METHOD OF AND APPARATUS FOR ELECTRICALLY WELDING TUBING.
APPLICATION FILED MAR. 24, 1919.

1,365,198.

Patented Jan. 11, 1921.
3 SHEETS—SHEET 2.

INVENTOR:
Frank L. Sessions

F. L. SESSIONS.
METHOD OF AND APPARATUS FOR ELECTRICALLY WELDING TUBING.
APPLICATION FILED MAR. 24, 1919.

1,365,198.

Patented Jan. 11, 1921.

3 SHEETS—SHEET 3.

INVENTOR:
Frank L. Sessions

UNITED STATES PATENT OFFICE.

FRANK L. SESSIONS, OF LAKEWOOD, OHIO.

METHOD OF AND APPARATUS FOR ELECTRICALLY WELDING TUBING.

1,365,198.  Specification of Letters Patent.  Patented Jan. 11, 1921.

Application filed March 24, 1919. Serial No. 284,652.

*To all whom it may concern:*

Be it known that I, FRANK L. SESSIONS, a citizen of the United States, residing at Lakewood, in the county of Cuyahoga and State of Ohio, have invented certain new and useful Improvements in Methods of and Apparatus for Electrically Welding Tubing, of which the following is a specification.

My invention relates to a method of and apparatus for electrically welding lap-seam or close-butted-seam tubing to make what is known as electrically welded seamless tubing. More specifically, it relates to a method of and apparatus for welding the seam of a preformed open-seam tube by electric current induced within and made to flow circumferentially around through the metal and across the lap-seam or close-butted seam of said tubing by means of a primary coil surrounding said tubing, said primary coil being energized by suitable alternating current.

The objects of my invention are to provide a new and useful method of electrically welding tubing; and new and useful apparatus for carrying out this particular method of electrically welding tubing.

Figure 4:
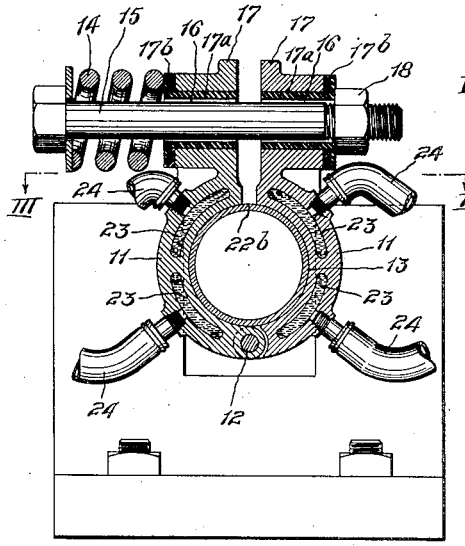
Figure 3:
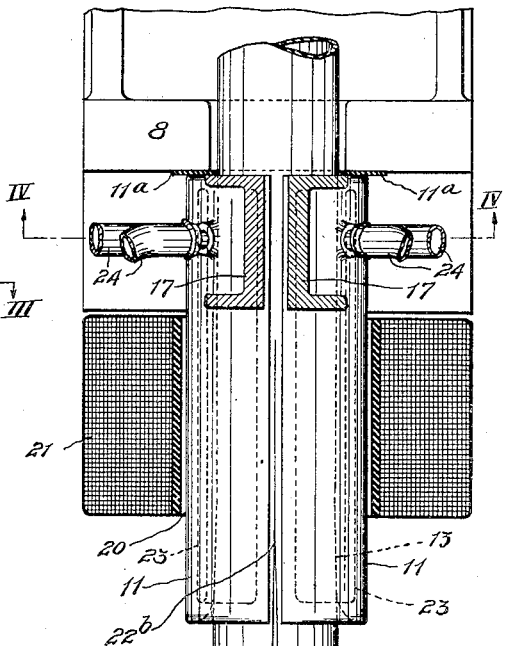
Figures 5, 6:
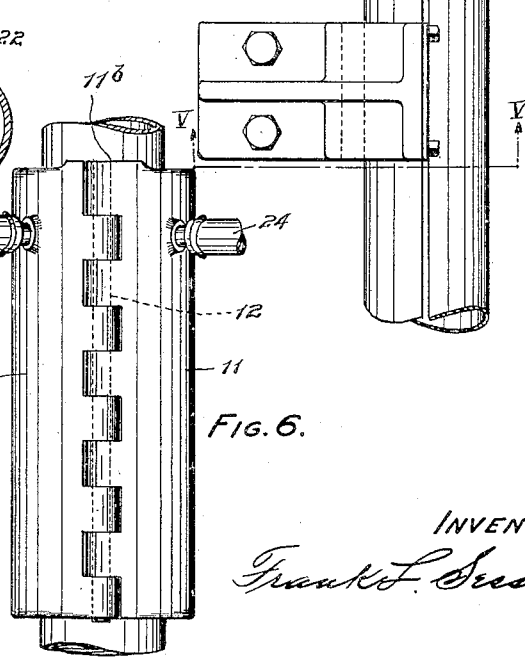
Figure 7:
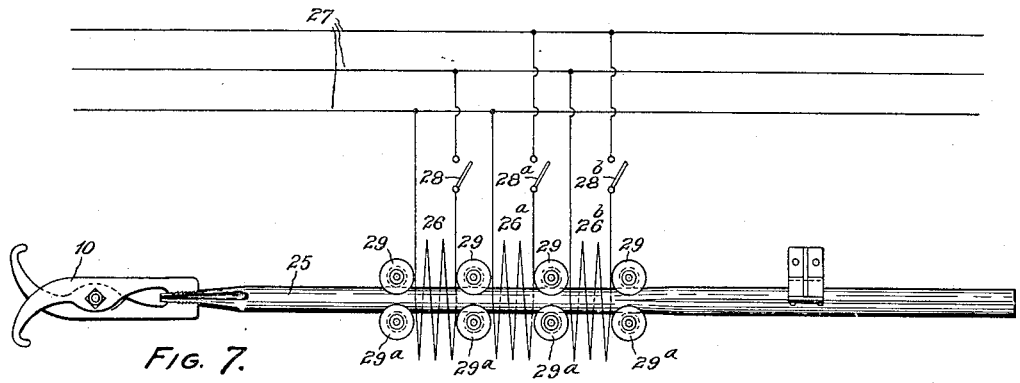
Figure 8:
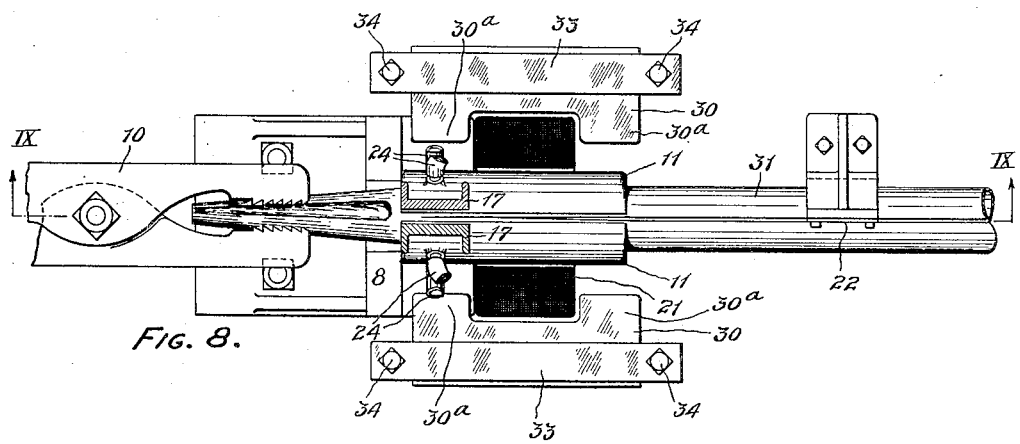
Figure 9:
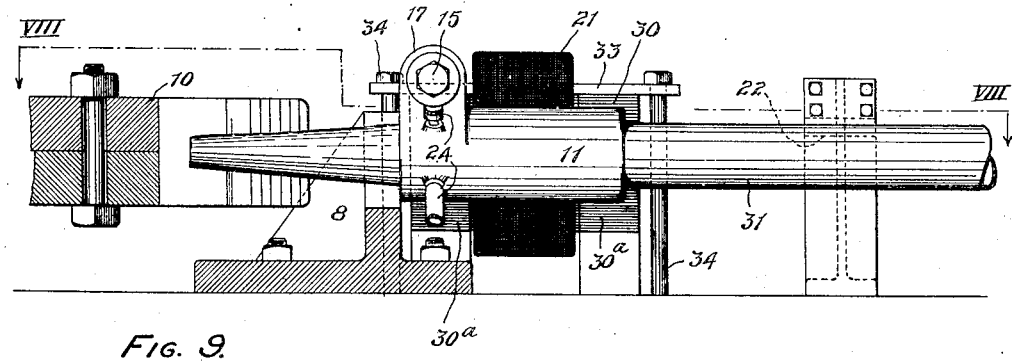

A clear understanding of my invention may be acquired by those skilled in the art from this specification and the accompanying drawings in which: Figure 1 is a perspective view of an apparatus embodying the principles of my invention; Fig. 2 is a fragmentary, longitudinal, vertical section on line II—II of Fig. 1; Fig. 3 is a plan view of another form of apparatus embodying the principles of my invention; Fig. 4 is a section on line IV—IV of Fig. 3; Fig. 5 is a section through the tube seam alining device on line V—V of Fig. 3; Fig. 6 is a bottom plan view of the welding inductor-die; Fig. 7 is a diagrammatic view of a tube being welded in accordance with my invention, the primary coil being divided into three sections connected respectively to the three phases of a three phase alternating current supply circuit; Fig. 8 is a plan view partly in section of an apparatus suitable for carrying out my invention in which the inductances of the welding coils are increased by the use of laminated steel or iron introduced into the magnetic circuit of the coils; Fig. 9 is a section on line IX—IX of Fig. 8, with the exception that the tube being welded and the welding inductor-die member are not shown in section; and Fig. 10 is a diagram illustrating my method of inducing electric currents in the tube being welded.

In Fig. 1, 1, represents a coil of insulated conductor having an axial opening, 2, extending through it. The coil, 1, is shown connected to the alternating current circuit wires, 3. A switch, 4, is provided for disconnecting the coil from the source of alternating electric current which current is transmitted to the switch through the circuit wires, 3. 5 is a rheostat or compensator connected in the circuit of the coil, 1, and adapted to regulate or control the flow of current therethrough. 6, is a piece of metal tubing which is shown as being seam-welded. The right hand end of the tube is shown to have an open seam, $6^a$, while at the left hand end, $6^b$, the seam is shown to have been welded. 7, is a metal die or bell such as is commonly used in the welding of furnace heated skelp into tubing. 8, is a bracket or abutment for the bell, 7, this bracket being mounted upon and secured to the frame, 9, of the welding machine. 10, is a gripping device for seizing the end of the tube and adapted to be connected to a draw-bench chain or other apparatus for progressively drawing the tube axially through the opening, 2, of coil, 1, and the die, 7.

The operation of the apparatus described is as follows:

The end, $6^c$, of the tube, 6, which is pointed so that it may readily pass through the coil, 1, and the die or bell, 7, is inserted through the coil and bell and the gripping jaws, 10, are made to seize the projecting pointed end, $6^c$. The tube is now in an open-seam condition the seam being close-butted where it passes through coil, 1. The switch, 4, is now closed and the coil, 1, is energized by alternating electric current from the source of alternating current supply. Upon energizing coil, 1, secondary electric currents will be immediately induced in the metal of the tubing, 6, and these secondary currents will flow circumferentially around and through the metal of the tubing across the close-butted seam. The tube will thus become heated to a welding temperature and if it be drawn through the bell or die, 7, by means of the tongs, 10, or by other means the seam will be welded together.

A longitudinal section of the die or bell, 7, is shown in Fig. 2. It consists of an annular metal ring having one end, 7ª, of the opening through it bell-mouthed to permit the tube to be readily drawn through it and compressed therein to make pressure between the heated contacting surfaces of the seam.

In Figs. 3, 4 and 6, instead of employing a closed annular die or bell I have shown a welding die composed of a pair of semi-circular pressure members, 11, hinged together at, 12, but separated at the opposite end of the diameter which passes through the hinge and the center of the hole, 13, through which hole the tube is drawn. For exerting pressure upon the tubing to cause the seam to be firmly pressed together, I have shown a spring, 14, and a bolt, 15, the latter passing through the holes, 16, 16, in lugs or ears, 17, 17, formed upon the welding pressure members, 11. The bolt, 15, is insulated from the flanges, 17, by means of insulating bushings and washers, 17ª, 17ᵇ. A nut, 18, upon the end of bolt, 15, affords means for adjusting the pressure of the spring upon the pressure members. It will be understood that any other convenient means may be employed for pressing the halves of the die together. It will also be apparent that other means than the die, such for instance as a pair of well known grooved pressure rollers may be used to press the abutting surfaces of the seam of the tube together to cause them to be welded when heated by electric current induced in the metal of the tube in the manner above described.

If the split die, 11, be used it may be made to abut against the bracket, 8, while the tube is being drawn through it and welded. The die, 11, may be held out of contact with the bracket, 8, by suitable insulation, 11ª, or it may be so constructed that it will bear against the bracket only at a point, 11ᵇ, diametrically opposite the seam in the tube.

The pressure members have a split hub-like portion extending along the tube into the opening, 20, of the primary coil, 21, which is shown in section in Fig. 3. The open-seam tubing to be welded may have its end pointed as in Fig. 1, and may then be passed through the hole, 13, in pressure members, 11, and the pointed end of the tubing may be seized and the tubing fed through the welding coil by drawing tongs similar to those shown at, 10, in Fig. 1, or it may be fed by other suitable means. A guide, 22, consisting of a thin metal blade mounted upon and secured to the stationary frame of the machine is provided. This guide is so formed that its blade-like end, 22ª, stands in the open seam of the tube to be welded and prevents the tube from revolving about its axis as it is drawn through the welding coil and die. In this manner the seam to be welded is made to pass through the die between the open ends of its circumference as clearly shown at, 22ᵇ, in Figs. 3 and 4. Fig. 4 is a cross section on line IV—IV of Fig. 3 and shows the relative position of the parts of the structure.

In order to prevent undue heating of the inductor-die members, 11, and the coil, 21, the former are provided with ducts, 23, through which water or other cooling fluid may be circulated. Suitable hose pipe connections, 24, may be provided for this purpose and any convenient means for circulating the cooling fluid through the ducts, 23, may be employed.

Preferably the ducts, 23, are made U-shaped so that the cooling fluid which enters one of the pipes, 24, passes along the length of the inductor member, 11, and back to the other pipe, 24, which is connected to the same duct in the same inductor half, 11.

In Fig. 7, the tube, 25, is shown as being welded by being passed through a primary coil wound in three sections or three primary coils, 26, 26ª and 26ᵇ. Each of the coils, 26, 26ª and 26ᵇ, is arranged to be energized by a different one of the phases of a three phase alternating current circuit, 27. Switches, 28, 28ª and 28ᵇ, may be employed for opening the circuits through the coils, 26, 26ª and 26ᵇ, respectively.

In Fig. 7 instead of employing a welding die such as the dies, 7 or 11, previously described, I have shown pressure rollers, 29, 29ª, arranged on opposite sides of the tubing in a well known manner. These pressure rollers, 29, 29ª, may, if desired, be power driven by any suitable means and be used instead of the drawing tongs, 10, for feeding the tube through the primary coil.

In the operation of the form of my invention shown in Fig. 7, the tube having been fed into position so that its left hand end has just emerged from the left hand rollers, 29, 29ª, all of the coils, 26, 26ª and 26ᵇ, may be energized, or, if the coils be separated as shown in Fig. 7, longitudinally of the tube, 25, coil, 26, may be energized first and the heating of the tube be confined to its left hand end. As the seam at this point becomes heated to the welding temperature the feeding apparatus may be started and the coils, 26ª and 26ᵇ energized. The tube passing through the coils, 26ᵇ, 26ª and 26, will be progressively heated and during its passage through the coils and pressure rollers the seam will be welded together.

It will be understood that the coils, 26, 26ª and 26ᵇ, may be energized by current taken from a single phase alternating current circuit or from any other suitable source of alternating current supply. It will further be understood that the coils may be wound close together without appreciable space between them, longitudinally and that a welding die of the sort shown at, 1, or 11, may be employed instead of the pressure rollers, 29, and 29ª.

In Figs. 8 and 9, I have shown the welding, inductor-die members, 11, the coil, 21, bracket, 8, guide, 22, and tongs, 10, used in the way they are shown to be used in Figs. 3, 4, 5 and 6. In Figs. 8 and 9, however, there are shown stacks of iron or steel laminations, 30, extending throughout portions of the magnetic circuit of the coil, 21, in order to reduce the reluctance of the magnetic circuit and increase the inductance of the coil, 21, and inductor-die, 11. The ends, 30ª, of the laminations, 30, extend part way over the ends of the coil, 21, leaving, however, ample room for the inductor-die, 11, and for the passage of the tube, 31.

The laminations, 30, are shown clamped to the frame of the machine by means of clamps, 33, and bolts, 34.

As another means to increase the inductance of the coils and the induction of secondary, circumferential currents in the metal of the tubing, there may be inserted into the tubing where it passes through the primary coil or coils, a laminated core, 35, consisting of iron or mild steel sheets properly bound together and of proper dimensions to readily enter the tube. To hold it against longitudinal displacement a rod, 36, secured to the bundle of laminations, 35, and extending backward through the tube to a convenient anchoring means, such as bracket, 37, (Fig. 1) may be employed. Instead of being made of sheet iron laminations, a bundle of soft iron or steel wires may be used for the core, 35.

The object of using the split inductor-die, 11, which, it will be observed, is in electrical parallel connection with the tube, is to reduce the resistance of the secondary electric circuit circumferentially of the tubing to be welded excepting at the seam itself. The induced currents in the metal of the tube and in the metal of the inductor-die will, therefore, not heat the tubing to any great extent excepting at the seam where it is desired that it be heated. This greater heating of the tube at the seam will occur to a lesser extent if the inductor-die be omitted as shown in Figs. 1 and 2, for the reason that the greatest heat in the secondary electric circuit will be developed at the point where its resistance is greatest and this is naturally at the seam where the metal surfaces of the seam abut against each other. These metal surfaces are necessarily imperfect and do not make perfect contact with each other, consequently the resistance of the seam is greater than that of any other part of the circumferential circuit through the metal of the tubing and greater heat will be developed at the seam than at other points in this circuit. By the use of the inductor-die, however, a very much larger proportion of the energy of the induced circuit will be expended at the seam than is expended there in the apparatus shown in Figs. 1 and 2.

Fig. 10, shows, diagrammatically, the inductive actions that occur in my method of welding tubing. In this figure the direction of current flowing in the primary coil, 1, at a given instant may be indicated by the arrowheads upon the wires leading to and from that coil. The magnetic flux set up by the current in coil, 1, is represented by the curved arrows, 38, shown as entering the left-hand end of the coil, 1, threading through the tube, 6, emerging at the right-hand end of the coil and returning around the outside of the coil to the left-hand end. The circumferential currents induced in the metal of the tube are represented by the arrows, 39.

Many of the advantages of my invention will readily occur to those skilled in the art. Among these advantages are the induction of electric welding currents within the metal of the tubing to be welded instead of in the secondary element of a separate transformer and the consequent avoidance of sliding or rolling contacts for conducting the electric current from the secondary of such transformer to the parts to be welded; simplicity of electric control; simplicity of mechanical construction; low cost to manufacture and operate; and increased production of welded tubing. From the use of my invention those skilled in the art will observe these and other advantages.

In this specification, I have referred to close-butted-seam tubing which is a trade name applied to unwelded tubing in which the edge surfaces of the metal at the seam are radial to the tube. It will be understood that my method of welding tubing by inducing electric welding currents in the metal of the tubing may be employed for welding lap-seam tubing as well as close-butted-seam tubing. I have used the term "close-butted-seam" in this specification, because the edge surfaces of the tube to be welded must be in electrical contact with each other and in this sense the seam is close-butted whether it be a lapped or butted joint.

Having thus described my invention, I claim and desire to secure by Letters Patent:

1. The method of electrically welding tubing which consists of passing an alternating electric current circumferentially around in a circuit exterior to and spaced from the unwelded-seam tubing which is to be welded, thereby causing alternating electric currents to be induced in the metal of said tubing and to flow in a circumferential direction through the metal of said tubing and simultaneously applying external pressure to that portion of said tubing in which said induced electric currents are flowing.

2. The method of electrically welding unwelded-seam tubing which consists of passing an alternating electric current through a circuit circumferentially with but spaced from the metal of a portion of the length of said tubing, thereby causing alternating electric currents to be induced in the metal of said tubing and to heat the contacting surfaces of the metal at the seam, simultaneously applying pressure to the heated portion of said seam within the field of induction of said first named alternating electric current to cause said seam to be welded together and progressively moving the tubing longitudinally through the field of induction of said first named alternating current whereby said seam is progressively heated and welded together in the manner described.

3. The method of electrically welding tubing which consists of causing an unwelded-seam tube to pass through an alternating magnetic field, the tube moving longitudinally of itself and parallel to the lines of force of said magnetic field to cause electric current to be progressively induced in the metal of said tube and flow through said metal in a direction circumferential of said tube across said seam, and simultaneously applying external pressure to that portion of said tube in which said induced current is flowing to press the walls of said seam together.

4. In apparatus for electrically welding tubing, a primary coil having an axial opening therethrough, means for feeding an unwelded-seam tube axially through said opening in said coil, and means for applying pressure to said tube within said coil to cause the abutting surfaces of said seam to be pressed firmly together, said primary coil being connected to a source of alternating electric current.

5. In apparatus for electrically welding tubing, means for exciting a field of alternating magnetic lines of force, means for feeding an unwelded-seam tube longitudinally through said field in a direction parallel to said lines of force and means within said field of force for applying external pressure to said tubing.

6. In apparatus for electrically welding tubing, means for exciting a field of alternating magnetic lines of force, means for feeding an open-seam tube longitudinally through said field of force in a direction parallel to said lines of force and means for simultaneously applying pressure to said tube in said field of force to cause the abutting surfaces of said seam to be pressed into contact with each other while passing through said magnetic field.

7. In apparatus of the class described, an electric coil, means for transmitting alternating current therethrough, means for feeding a tube through the magnetic field set up by said current flowing in said coil and means for applying external pressure to that portion of said tube which is within said magnetic field.

8. In apparatus of the class described, an electric coil, means for transmitting alternating current therethrough, means for feeding a tube through the space inclosed by said coil and means within said space for applying external pressure to said tube.

9. In apparatus of the class described, an electric coil, means for transmitting alternating current therethrough, means for feeding a tube through the magnetic field set up by said current in said coil and electric conducting means in contact with a portion of the circumference of said tube within said magnetic field.

10. In apparatus of the class described, an electric coil, means for transmitting alternating current therethrough, means for feeding a tube through a magnetic field set up by said current in said coil, and a roller of conducting material, having a peripheral groove conforming to and contacting with a portion of the circumference of said tube.

11. The method of welding the contacting surfaces of an open seam in metal which consists of passing the metal through a field of alternating magnetic force to cause alternating currents of electricity to be induced in the metal and to flow across said seam and simultaneously applying external pressure to the metal upon opposite sides of said seam within said field of force to press said contacting surfaces together.

12. The method of welding the contacting surfaces of an open seam in tubing which consists of causing a field of alternating magnetic force to pass through a portion of the length of the tube whereby alternating electro-motive-forces are induced in the wall of the tube and alternating electric currents are caused to flow across said seam to heat the surfaces thereof to a welding temperature, applying external pressure to said tube within said field of force and simultaneously causing relative movement of said field of force and said tube longitudinally of said tube whereby said seam is progressively welded together.

13. The method of welding together the contacting surfaces of an open seam in metal which consists of progressively traversing the metal adjacent to said seam with a field of alternating magnetic force to cause alternating currents of electricity to be induced in the metal and to flow across said seam and simultaneously applying external pressure to said metal to press the walls of said seam together.

14. The method of welding together the contacting surfaces of an open seam in metal which consists of progressively traversing the metal adjacent to said seam with a field of alternating magnetic force to cause alternating currents of electricity to be induced in the metal and to flow across said seam thereby progressively heating said surfaces to a welding temperature, and simultaneously and progressively applying external pressure to said metal within said field to cause said contacting surfaces to be pressed firmly together.

15. The method of welding the contacting surfaces of an open seam in metal which consists of subjecting the metal adjacent to said seam to the inductive action of alternating magnetism whereby electric currents are induced to flow across said seam in said metal and to heat said contacting surfaces to a welding temperature, applying external pressure to the metal on opposite sides of said seam where said induced currents are flowing, and simultaneously causing progressive relative movement of said metal and said alternating magnetism longitudinally of said seam.

16. In apparatus for electrically welding tubing, means for exciting a field of alternating magnetic force, means for feeding a tube through said field of force, and means for applying external pressure to said tube in said field of force.

17. In apparatus for electrically welding tubing, means for exciting a field of alternating magnetic force, means for feeding an open seam tube through said field of force, and means for simultaneously applying external pressure to said tube within said field of force to cause the abutting surfaces of said seam to be pressed into contact with each other.

18. In apparatus for electrically welding tubing, means for exciting a field of alternating magnetic force, means for feeding a tube through said field of force, and electrical conducting means in electrical contact with said tube and surrounding a portion of the circumference of said tube within said field of force.

19. The method of electrically welding unwelded seam tubing which consists of passing an alternating current in an exterior circuit circumferentially around and spaced away from the metal of a portion of the length of said tubing, thereby causing alternating electric currents to be induced in the metal of said tubing and to heat the contacting surfaces of the metal at the seam, applying external pressure to the metal upon opposite sides of the heated portion of said seam within the field of induction of said first named alternating current to cause said seam to be welded together and progressively moving the tube longitudinally through the field of induction of said first named alternating current whereby said seam is progressively heated and welded together in the manner described.

20. In apparatus of the class described, the combination of a close-butted-seam tube, electrical conducting means surrounding a portion of the circumference of said tube and in electrical parallel connection therewith, and means for causing alternating magnetic lines of force to pass longitudinally through the space encompassed by said tube and said electrical conducting means.

21. In apparatus of the class described, a close-butted-seam tube, an electric coil, means for transmitting alternating current therethrough, means for feeding said tube through the magnetic field set up by said current flowing in said coil, electrical conducting means surrounding a portion of the circumference of said tube in said magnetic field, said electrical conducting means being in electrical parallel connection with said tube.

22. In apparatus for electrically welding tubing, the combination with the tube to be welded of electrical conducting means surrounding a portion of said tube and in electrical parallel connection therewith, means for causing alternating magnetism to pass through said tube and said electrical conducting means, and means for causing relative movement of said tube and said electrical conducting means longitudinally of said tube.

23. In apparatus for electrically welding a close-butted-seam in tubing the combination with the tube to be welded, of electrical conducting means surrounding a portion of said tube and in electrical parallel connection therewith, means for causing alternating magnetism to pass through said tube and said electrical conducting means, means for causing relative movement of said tube and said electrical conducting means longitudinally of said tube, and means for pressing together the contacting surfaces of the seam being welded.

24. In apparatus of the class described, the combination of a close-butted-seam tube, electrical conducting means connected in parallel with a portion of the circumferential circuit of said tube and means for inducing electro-motive-forces in said tube and said conducting means to cause electric current to flow across the seam in said tube.

25. In apparatus for electrically welding tubing, means for exciting a field of alternating magnetic force, means for feeding an open seam tube through said field of force, electrical conducting means electrically in parallel with said tube in said field of force and means for applying pressure to said tube to cause the abutting surfaces of said seam to be simultaneously pressed into contact with each other.

26. In apparatus for electrically welding tubing, means for exciting a field of alternating magnetic force, means for feeding a tube through said field of force, and electrical conducting means electrically in parallel with said tube in said field of force.

27. In apparatus of the class described, the combination of a close-butted-seam tube, electrical conducting means connected in parallel with a portion of the circumferential circuit of said tube, means for inducing electro-motive-forces in said tube and said conducting means to cause electric current to flow across the seam in said tube and means for causing relative movement of said tube and said conducting means longitudinally of said tube.

28. In apparatus for electrically welding a close-butted-seam in tubing, the combination with the tube to be welded, of electrical conducting means electrically in parallel with a portion of said tube, means for causing alternating magnetism to pass through said tube and said electrical conducting means, means for causing relative movement of said tube and said conducting means longitudinally of said tube, and means for pressing together the contacting surfaces of said seam.

29. In apparatus for electrically welding tubing, the combination with the tube to be welded of electrical conducting means surrounding a portion of said tube and in contact therewith, means for causing alternating magnetism to pass through said tube and said conducting means and means for pressing said conducting means against said tube.

30. In apparatus for electrically welding the longitudinal seam formed by the close-butted ends of an open annular ring, electrical conducting means encircling said ring open circuited at the seam thereof, said conducting means being electrically in contact with said ring and means for inducing electro-motive-forces in said ring and said electrical conducting means to cause electric current to flow across said seam to heat the contacting surfaces thereof to a welding temperature.

31. In apparatus for electrically welding the longitudinal seam formed by the close-butted ends of an open annular ring, electrical conducting means connected in parallel with a portion of the circumferential circuit of said ring and means for inducing electro-motive-forces in said ring and said electrical conducting means to cause electric current to flow across said seam to heat the contacting surfaces thereof to a welding temperature.

32. In apparatus for electrically welding tubing, means for exciting a field of alternating magnetic force, means for feeding an open seam tube through said field of force, flexible electrical conducting means surrounding said tube but electrically open circuited at the seam thereof and means for pressing said electrical conducting means into contact with said tube to simultaneously cause the surfaces of said open seam to be pressed together.

33. In apparatus for electrically welding tubing, means for supporting a tube, means for causing said tube to be progressively traversed longitudinally of said tube by a field of alternating magnetic force, and electrical conducting means electrically in parallel circumferentially with said tube in said field of force.

34. In apparatus for electrically welding tubing, an electric coil, means for transmitting electric current therethrough, means for feeding the tube being welded through the magnetic field of force of said coil and a magnetizable core within said tube in said field.

35. In apparatus for electrically welding the contacting surfaces of an open seam in metal, an electrical coil, means for transmitting electric current therethrough, a magnetizable armature adjacent to and spaced from said coil and means for feeding the work through the space between said coil and said armature.

In testimony whereof I affix my signature in the presence of two witnesses.

FRANK L. SESSIONS.

Witnesses:
ALFRED C. NELSON,
MARGARET FELD.